H. L. BELL.
EARTHWORKING IMPLEMENT.
APPLICATION FILED APR. 27, 1914.

1,132,152.  Patented Mar. 16, 1915.

Inventor
Harry L. Bell

Witnesses

By

Attorneys

UNITED STATES PATENT OFFICE.

HARRY L. BELL, OF NORFOLK, VIRGINIA.

EARTHWORKING IMPLEMENT.

1,132,152.   Specification of Letters Patent.   Patented Mar. 16, 1915.

Original application filed February 12, 1914, Serial No. 818,342. Divided and this application filed April 27, 1914. Serial No. 834,657.

*To all whom it may concern:*

Be it known that I, HARRY L. BELL, a citizen of the United States, residing at Norfolk, in the county of Princess Anne and State of Virginia, have invented new and useful Improvements in Earthworking Implements, of which the following is a specification.

This invention relates to an improved earth working implement for attachment to cultivators, is a division of application, Serial No. 818,342, filed February 12, 1914, for a cultivator, and has for an object to provide an implement of this character for use particularly in trucking and to take the place, to a large extent, of wheel hoes, wheel rakes, and other forms of hand operated and animal drawn implements heretofore employed in this particular line of cultivation.

The implement of this invention is designed particularly for destroying grass, weeds and the like, and for cultivating vegetables grown in single or multiple rows or drills on truck beds, the present device being particularly adapted for spinach and lettuce growing.

An important feature of this invention is to provide an earth working implement which will destroy the fine young grass and weeds not only between the drills on the truck beds, but also on the sides of the beds, and to provide a device which may be adjusted to beds of various widths and to rows or drills spaced apart at various distances on the beds.

The following detail description of the present embodiment of the invention will disclose the above and other objects and advantages of the invention, the present embodiment being disclosed in the accompanying drawing, wherein,—

Figure 1:
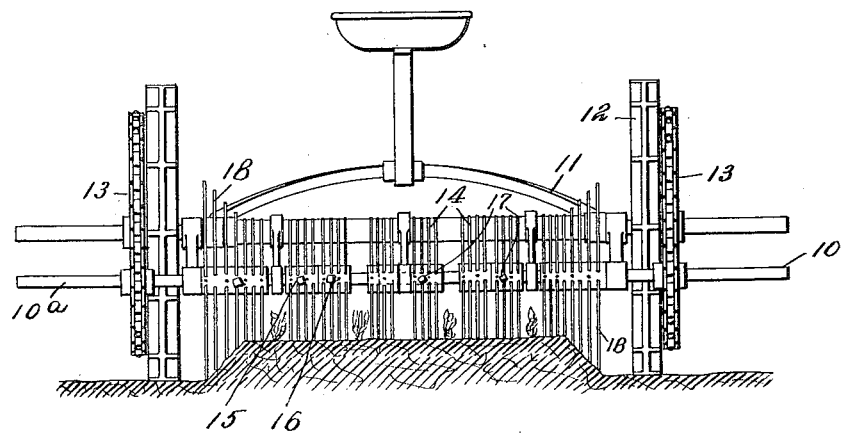
Figure 2:
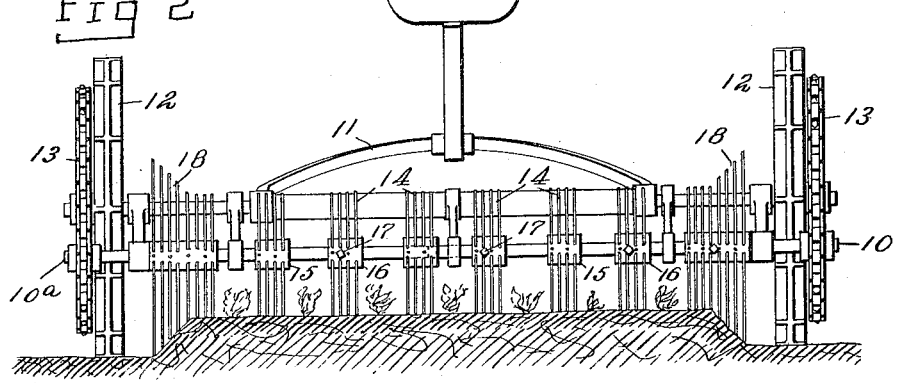

Figure 1 is an elevational view of the improved earth working implement applied to a cultivator frame, and Fig. 2 is a similar view disclosing the implement adjusted to accommodate a greater number of rows on a wider truck bed.

Referring to the drawing 10 designates a shaft which is mounted upon a suitable cultivator frame 11, the latter being supported upon traction wheels 12 having a chain and sprocket connection 13, between the traction wheels 12 and the shaft of the implement. Mounted upon the shaft 10 are a plurality of spring wire brushes 14, the hubs of which are made in two parts, 15 and 16, adjustable toward and from each other on the shaft 10 and held in position by set screws 17. As shown in Fig. 1 the hub sections of the brushes 14 are secured close together to accommodate a relatively narrow truck bed having but four rows or drills. In Fig. 2 the hub sections 15 and 16 are shown separated or spread apart upon the shaft 10 whereby to accommodate seven rows or drills upon a relatively wide truck bed. It is of course understood that additional brush sections or brushes 14 may be placed upon the shaft 10 to accommodate a greater number of rows or drills, or, on the other hand, one or more of the brushes 14 may be removed from the shaft 10 to accommodate a relatively small truck bed having but few rows or drills.

In order that the traction wheels 12 of the cultivator frame may turn freely, and in order that the implement may not be injured, the shaft 10 is preferably made in two sections 10 and 10$^a$, the same meeting in one of the hub sections 16, the latter constituting a bearing for the meeting ends of the shaft 10.

The implement is adapted to straddle the truck bed and in order to pulverize the earth at the sides of the beds as well as on top of the same, and to remove the grass and weeds from the sides of the beds, the end brushes 18 have their peripheries so shaped as to conform to the top and sides of the bed. As shown in the drawing, these end brushes 18 have their wires consecutively increased in length, from about the intermediate portion of the brush to the outer end thereof, whereby an outwardly flaring periphery to the brush is formed. These elongated wires or bristles of the brush operate upon the sloping sides of the beds and thus treat the soil forming the sides in the same manner as do the intermediate brushes 14 treat the top of the bed between the rows or drills.

What is claimed is,—

1. An earth working implement comprising a brush adapted to straddle a truck bed or the like and having flaring peripheries at its opposite ends to accommodate the sloping sides of the truck bed.

2. In a cultivator, a shaft, a plurality of cultivator members mounted on the shaft adapted for operation on truck beds, the end cultivator members having peripheries conforming to the top edges and sides of the truck beds.

3. In a cultivator, a frame, a rotating shaft on the frame and a plurality of brushes mounted for adjustment toward and from each other on the shaft adapted to operate on truck beds, the outer end brushes having outwardly flaring peripheries whereby to conform to the sides of the truck beds.

4. In a cultivator, a rotating shaft and a plurality of spring wire brushes mounted on the shaft for adjustment longitudinally thereon, the hubs of said brushes being divided into a number of sections adapted to be spaced apart whereby to divide the brushes up into a number of relatively small brush sections.

5. In a cultivator, a rotating shaft, and a plurality of brushes fixed to the shaft, the intermediate brushes having sectional hubs adapted to be spaced apart to accommodate a number of relatively close rows or drills, the outer brushes having outwardly flaring peripheries whereby to conform to the top of the edges and sides of the truck beds.

In testimony whereof I have hereunto set my hand in presence of two subscribing witnesses.

HARRY L. BELL.

Witnesses:
T. D. SAVAGE,
J. M. CURRIE.

Copies of this patent may be obtained for five cents each, by addressing the "Commissioner of Patents, Washington, D. C."